June 21, 1927.

C. A. LAKE 1,633,113

LIQUID LEVEL INDICATOR

Filed Aug. 11, 1926

INVENTOR.
Clyde A. Lake

BY

ATTORNEY.

Patented June 21, 1927.

1,633,113

UNITED STATES PATENT OFFICE.

CLYDE A. LAKE, OF DETROIT, MICHIGAN.

LIQUID-LEVEL INDICATOR.

Application filed August 11, 1926. Serial No. 128,563.

This invention relates to a liquid level indicator so mounted on a plug of a tank or container that the plug can be as easily inserted or removed with the indicator attached as without the indicator thereon.

Another object of the invention is to provide a liquid level indicator having a calibrated pointer which projects through an opening in the plug and is so connected to a float that the movement of the latter will cause the pointer to rise and fall. The pointer, however, is so arranged that its movement is very materially less than that of the float, so that the indicator may be employed where there is not sufficient headroom for a pointer to rise and fall through a distance equal to the depth of the tank.

A further object of the invention is to provide a liquid level indicator that may be quickly and easily mounted on any existing plug in such a manner that it may remain stationary while the plug is turned to screw or unscrew it into or out of a tank, because some tanks are so shaped that an indicator might become damaged by striking the sides if it were necessary for the indicator to turn the plug.

With these and other objects in view which will become apparent as the specification proceeds, the invention is hereinafter more fully described with the aid of the accompanying drawings, in which.

Figure 1:
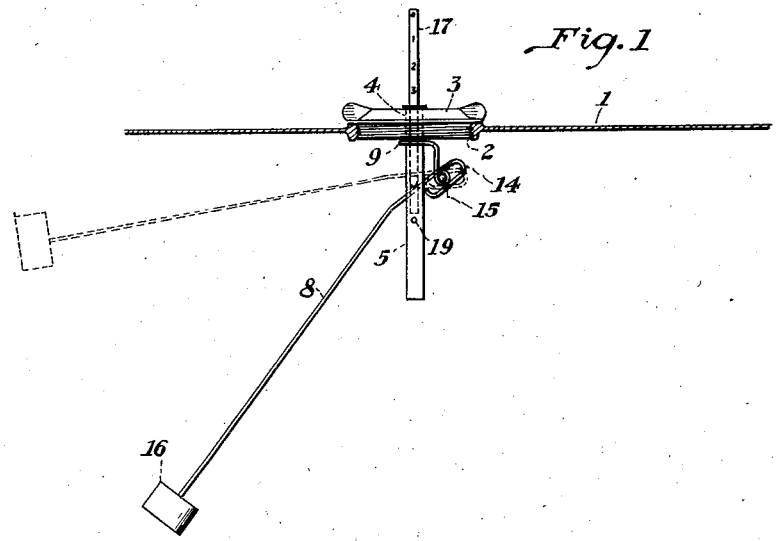
Figure 1 illustrates a side view of the invention mounted on a plug which is in turn threaded into a tank, a portion of which latter is also shown.
Figure 2:
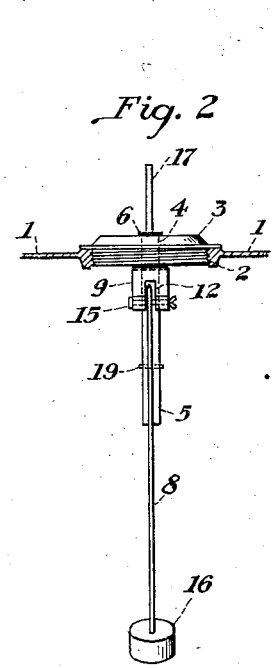
Figure 2 shows an end view of the invention mounted on a plug.
Figure 4:
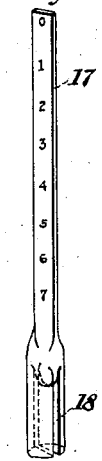
Figure 4 shows the calibrated pointer.
Figure 3:
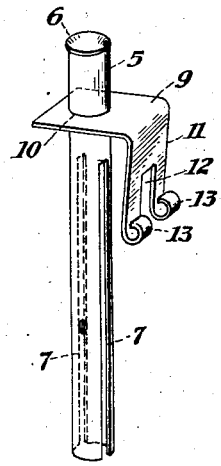
Figure 3 is a view of the tubular member in which the pointer moves, and the angle bracket secured around the member.

Referring to the drawings, 1 designates portion of a tank or container of any desired construction and shape having a threaded opening 2 to receive a plug 3. Through the latter a passage 4 is provided for a tubular member 5 which is usually expanded at its upper end 6 to prevent it from slipping down through the said passage. Through the opposite sides of the tubular member are slots 7 which extend from its lower end for the greater portion of its length.

An angle bracket 9 having a hole 10 therethrough is secured around the tubular member 5 above the top of the slots 7 and should be so positioned as to be just clear of the underside of the plug 3, so that the latter may be freely turned while the tubular member and the angle bracket remain stationary. The depending portion of the angle bracket is slotted substantially centrally at its lower end as shown at 12 and the lower margins of the depending portion are rolled upwards to form bearings 13.

One end of the lever arm 8 has an eye which is pivotally mounted on a cotter pin 15 which also passes through the bearings 13. Intermediately of its length the lever arm passes through the slots 7 which act as guides, and at its opposite end the lever arm has a float 16 mounted thereon. Between the float and that portion of the lever arm which moves in the slots 7 the arm is flexed so that the float end is downwardly inclined in most positions.

The calibrated pointer 17 is slidably mounted in the tubular member 5 and has a bifurcated lower end 18 which rests on the lever arm 8. The upper portion of the pointer is calibrated so that the numeral level with the top of the tubular member will indicate the number of inches or gallons of liquid in the tank.

The pin 19 driven through the tubular member substantially at right angles to the slots 7 prevents the lever arm 8 and the pointer 17 dropping out of the tubular member when the plug is being inserted or removed.

While in the foregoing the preferred embodiment of the invention has been described and shown, it is understood that the construction is susceptible to such modifications as fall within the scope of the appended claims.

What I claim is:—

1. A liquid level indicator comprising a plug having a passage therethrough, a tubular member extending through said passage and supported by said plug, said member having vertical slots therein from its lower end, an angle bracket secured around said member under said plug, bearings integral with said angle bracket, a lever arm extending through said vertical slots, an eye on one end of said lever arm, said eye being pivotally attached to said bearings, a float on the other end of said lever arm, and a calibrated pointer adapted to move vertically in said tubular member and resting on said lever arm.

2. A liquid level indicator comprising a plug having a passage therethrough, a tubular member extending through said passage and supported by said plug, said member having vertical slots therein from its lower end, an angle bracket secured around said member under said plug, said angle bracket having a depending face slotted from its lower margin which is flexed upwardly to form bearings, a lever arm extending through said vertical slots in said tubular member, an eye at one end of said lever arm inserted in said latter slot between said bearings, a pin through said eye and said bearings, a float on the other end of said lever arm, and a calibrated pointer adapted to move vertically in said tubular member and resting on said lever arm.

3. A liquid level indicator comprising a plug having a passage therethrough, a tubular member extending through said passage and so supported by said plug that the latter may rotate independently of said tubular member, said member having vertical slots therein extending upwards from its lower end, an angle bracket secured around said member under said plug, said angle bracket having a depending face slotted from its lower margin which is flexed upwardly to form bearings, a lever arm extending through said slots in said tubular member, an eye at one end of said lever arm, a pin through said eye and said bearings, a float on the other end of said lever arm, said lever arm being flexed downwardly between said tubular member and said float, and a calibrated pointer mounted in said tubular member and having a bifurcated lower end, said bifurcations resting one on each side of said lever arm.

CLYDE A. LAKE.